United States Patent Office 3,422,070
Patented Jan. 14, 1969

3,422,070
PROCESS OF PRODUCING POLYOXYMETHYLENES
Shinichi Ishida and Hiroshi Ohama, Tokyo, and Koichi Matsumoto, Kawagoe-shi, Japan, assignors to Asahi Kasei Kogyo Kabushiki Kaisha, Osaka, Japan, a corporation of Japan
No Drawing. Filed Dec. 23, 1964, Ser. No. 420,791
Claims priority, application Japan, Dec. 23, 1963, 38/68,980; Dec. 24, 1963, 38/69,215; Feb. 18, 1964, 39/8,334
U.S. Cl. 260—67    11 Claims
Int. Cl. C08g 1/02; C08g 1/28

ABSTRACT OF THE DISCLOSURE

A method of producing high molecular weight polyoxymethylene in which a solid low molecular weight polyoxymethylene is washed with an organic solvent which is hygroscopic and has dehydrating properties. The washed solid polyoxymethylene is then decomposed to form formaldehyde which in turn is polymerized to produce the desired high molecular weight polyoxymethylene.

---

The present invention relates to a process of producing polyoxymethylenes which are linear polymers of formaldehyde. It is a well-known fact that the polymerization of purified formaldehyde affords a high molecular weight polyoxymethylene having excellent physical properties as well as good processability. For this reason, a variety of processes for purifying formaldehyde have been developed and most of these aim at dehydrating of formaldehyde gas. This is because, since water and other impurities act as a chain transfer agent in the polymerization of formaldehyde, only a less stable polyoxymethylene of lower molecular weight is obtained in the presence of these impurities as known. However, the purification of gaseous or liquid formaldehyde is extremely difficult owing to its unique physical and chemical properties and suitable dehydrating agents have not been found. From these reasons, the cooling method is exclusively employed as the purification method. This method is characterized in that the impurities are removed by use of trap separators or the like at a low temperature, but it has a disadvantage of requiring industrially complicated apparatus which complicates the control and accordingly leads to a high cost of production.

An object of this invention is to provide a process of producing a high molecular weight polyoxymethylene at a low cost and with ease by improving the complicated purification of formaldehyde in the conventional production of polyoxymethylene.

In other words, this invention is characterized in that substantially anhydrous formaldehyde gas which is liberated by the thermal decomposition of substantially anhydrous polyoxymethylene of low molecular weight, particularly paraformaldehyde, is introduced into a reaction medium containing a polymerization catalyst without passing through a cooling and dehydrating trap, whereby formaldehyde is polymerized to yield the high molecular weight polyoxymethylene.

The low molecular weight polyoxymethylenes which are the starting material for the production of high molecular weight polyoxymethylene are α- or β-polyoxymethylene and the like which are conventionally obtainable by adding acid or alkali to aqueous solutions of lower polyoxymethylene prepared by cooling or concentrating 30–80 percent aqueous formaldehyde solution or so-called paraformaldehyde or formaldehyde. These, however, contain a considerable amount of free water. When subjected to the thermal dehydration, these decompose readily to be converted into hydrated formaldehyde. Further, even though the dehydration is attempted at a low temperature under a reduced pressure in order to avoid the decomposition to formaldehyde, the low molecular weight polyoxymethylene can not be used as the starting material suitable for the production of high molecular weight polyoxymethylenes since the low molecular weight polyoxymethylene is so hydrophilic that the removal of the water is considerably difficult. For example, Australian Patent 221,078 (1958) discloses as follows: Attempts to treat paraformaldehyde with desiccants, adsorbents, etc. have so far been unsuccessful in further purifying the formaldehyde to any great extent.

The present invention provides a process of producing high molecular weight polyoxymethylenes, a method of purifying paraformaldehyde or other low-molecular weight polyoxymethylene and further a process of producing high molecular weight polyoxymethylenes therefrom.

According to this invention, paraformaldehyde or low molecular weight polyoxymethylene is first treated in such organic solvents as will be described later to afford pure paraformaldehyde or low molecular weight polyoxymethylene. This method is based on the finding that washing with liquid, which is prevalent in the purification of solid substances, exhibits an unexpectedly good effect in the case of paraformaldehyde.

The present process consists of substantially washing the commercial paraformaldehyde contaminated by a considerable amount of impurities with an anhydrous organic solvent which is hygroscopic in nature and has a dehydrating ability, extracting and dipping the paraformaldehyde thus treated, separating the resultant solid, subjecting the separated solids to thermal decomposition without evaporating the residual solvents therein to produce formaldehyde and then polymerizing the obtained formaldehyde without further purification.

The present process represents an improvement in that it provides an easier purification method as compared with the conventional processes. In other words, the formaldehyde obtained by the present process is capable of being subjected to the polymerization without any severe purification. This fact will be later explained in detail by the examples. According to the invention, treatments of commercial paraformaldehyde which can not yield a sufficiently high molecular weight polyoxymethylene as is, can produce a sufficiently high molecular weight polyoxymethylene which has excellent heat stability.

The treatments of this invention are carried out by using the organic solvents which satisfy the following conditions.

(1) They have to be hygroscopic in nature.
(2) They have to be of a strong dehydrating ability.
(3) They have to be substantially anhydrous.
(4) They can not depolymerize polyoxymethylene.

Further, from a practical standpoint they must (5) be readily and economically dried.
(6) hardly affect the polymerization.

Thus, the solvents employed in this invention are as follows:

(1) Lower alcohols, diols, polyols all having less than 8 carbon atoms.
(2) Aliphatic carboxylic acid anhydride containing not more than 4 carbon atoms.
(3) Ethers having less than 8 carbon atoms.
(4) Some kinds of polar solvents.

Each of these is illustrated in the following:
    (1) Lower alcohols, diols, polyols.

Methylalcohol, ethylalcohol, propylalcohol, isopropylalcohol, ethyleneglycol, monomethylethylene glycol, diethyleneglycol, glycerin, benzylalcohol.

(2) Acetic anhydride, propionic anhydride, acetic-propionic anhydride, succinic anhydride, crotonic anhydride, maleic anhydride, phthalic anhydride, itaconic anhydride, isobutyric anhydride.

(3) Dimethylether, ethyl methylether, diethylether, dipropyl ether, ethylene glycol dimethyl ether, diethylene glycol dimethyl ether, ethyl propyl ether, di-isopropyl ether, methyl propyl ether, ethylene oxide, tetrahydrofuran, propylene oxide, dioxan, cyclohexabutane, anisol, methyl benzyl ether.

(4) Ketones: Actone, methyl ethyl ketone, diethyl ketone, ethyl propyl ketone, acetophenone.

(5) N,N'-dimethyl formamide, N-methylpyrrolidone, dimethyl sulfoxide, N,N'-dimethyl acetamide, pyrrolidone, diethyl sulfoxide, tetramethylene sulfone.

These solvents have to be substantially anhydrous before use. It is possible to use a mixed solvent composed of more than two kinds of these compounds and further a mixed solvent consisting of these compounds and the other solvents such as hydrocarbons and chlorinated hydrocarbons.

The present process is preferably carried out at such a temperature that the low molecular weight polyoxymethylene used does not decompose, that is, at a temperature ranging from a low temperature of −20° C. to room temperature to temperatures near 50° C. This process may be conducted according to a continuous method or a batch method. The solvents used in the above-mentioned treatments can be recycled after purification and drying. The amounts of the solvents used are not restricted in particular, though it is necessary to use a sufficient amount of solvents to cover completely the whole surface of the polyoxymethylene. The characteristics in the performance of this invention are further illustrated in detail. It may be uncertain whether the water content is decreased by this treatment to such a small amount as required in order to obtain a sufficiently high molecular weight polyoxymethylene.

As for this problem, it is established that the commercial paraformaldehyde, which contains water as its main impurity and this is not capable of yielding formaldehyde of high purity, can be dehydrated by the present treatment to a water content necessary and suitable for the polymerization. Co-existence of alcohols has to be forbidden in the polymerization of formaldehyde in general.

When the low molecular weight polyoxymethylene treated with alcohols according to this invention is pyrolyzed to produce formaldehyde, the resulting formaldehyde can not contain any of the alcohols which have been employed as the dehydrating agent. However, it has been established that the alcohols do not interfere with the polymerization in practice as will be obvious in the following examples.

EXPERIMENT (A)

Formaldehyde obtained by decomposing the anhydrous paraformaldehyde, which was treated with absolute methanol at a temperature of 50° C., was bubbled into toluene containing a catalytic amount of pyridine at a temperature of −20° C. for 2 hours.

EXPERIMENT (B)

The formaldehyde prepared from the untreated paraformaldehyde was polymerized in the very same manner as in Experiment (A).

EXPERIMENT (C)

The formaldehyde obtained by decomposing the untreated paraformaldehyde was carefully purified by passing through four traps cooled to a temperature of −10° C., and then polymerized in the same manner as in Experiment (A).

These experimental results are as follows:

| Starting material | Yield | Viscosity of polymers | Di-acetate of polymers obtained | |
|---|---|---|---|---|
| | | | Mold-ability | Heat-stability |
| A | 50 | 1.52 | Good | Good |
| B | 15 | 0.43 | Bad | Bad |
| C | 62 | 1.42 | Good | Good |

Even though the polymerization is carried out in the presence of such compounds as methanol which have been hitherto forbidden to be used in these cases, high molecular weight polyoxymethylene, which can be sufficiently molded, is found to yield. The above-mentioned solvents have less influence on said polymerizations than methanol.

The effectiveness of the method of this invention will be shown in the following examples.

The compounds which have hitherto been prevalent as a catalyst in the polymerization of formaldehyde can be employed in the method of this invention as a polymerization catalyst, but it is preferable to use the polymerization catalysts capable of dissolving in the reaction media. As catalysts, primary, secondary and tertiary-aliphatic and alicyclic amines, and primary aromatic amines are usable. These include methylamine, ethylamine, butylamine, octylamine, dodecylamine, octadecylamine, dibutylamine, ethyloctylamine, tributylamine, trihexylamine, dimethyloctadecylamine, didodecylmethylamine, cyclohexyldibutylamine, cyclohexylamine, diethylcyclohexylamine, pyridine, pyrimidine, aniline, toluidine, and the like. The onium salts include tertammonium salts such as tetramethyl ammonium bromide, diethyl dioctadecylammonium chloride, tri-n-butyl dodecylammonium iodide, triethyl benzylammonium laurate, benzyl trimethyl ammonium nonylphenylate, and dimethyl dioctadecylammonium acetate, such as sulfonium salts as tetraethyl phosphonium iodide, triethyl octadecyl phosphonium bromide, and tributyl ethyl phosphonium iodide, and such tert-sulfonium salts as tributylsulfonium bromide, trimethyl sulfonium iodide, phenyl dibutylsulfonium acetate, and cyclohexyl diethoxysulfonium benzoate. Organometallic compounds are also preferably used as the polymerization catalysts. For example, triethyl aluminum, diethyl zinc, triethyl antimony, triethyl arsine and the like are particularly preferable. Furthermore, carbonamides and thiocarbonamides can be effectively employed as the polymerization catalyst in this invention. Among these groups, for example, tetramethylurea, tetramethylthiourea, ethyl-N,N-dimethylcarbomate, N,N - dimethylformamide, N,N - dimethylacetamide, and ethyl 1-phenylhydrazocarbonate are usable in this invention. As carbodiimides, for example, diethyl carbodiimide, diisopropyl carbodiimide, and dibenzyl carbodiimide are illustrated. It is also possible to use such a variety of well-known polymerization catalysts as pentamethyl guanidine, O - methylisourea, O,N,N - trimethylisourea, S-ethylisourea, N,N-dimethyl-S-isourea, caprolactyl-O-benzyl ether, benzaldehyde-hydrazone, butyraldehyde-phenylhydrazone, and acetophenone-thiosemicarbazone acetoxime.

As the reaction medium, most of the organic solvents having no active hydrogen can be employed. However, among the groups of ethers, nitriles, aliphatic hydrocarbons, aromatic hydrocarbons, and halogenated hydrocarbons, those which are liquid at the reaction temperature are preferable, particularly toluene, xylene and the like are most preferable.

The polymerization can be carried out at a temperature of −40° C. to 90° C. More particularly, it is preferably performed at a temperature of −30° C. to 40° C. The decomposition temperature of the substantially anhydrous paraformaldehyde is between 100° C. and 250° C.

Formaldehyde gas liberated by the decomposition is preferably introduced into a reaction vessel together with dried inert gas, particularly, dried nitrogen optionally through a washing tower.

The high molecular weight polyoxymethylene which is produced according to the present invention is snow white powders or flakes and can be supplied as raw materials of moldings after the conventional terminal group stabilization treatment and the addition of various stabilizers.

In the following examples, there are described several preferred embodiments to illustrate the present invention in detail. However, it should be understood that the invention is not intended to be limited to the specific embodiments.

Example 1

To 300 parts of absolute methanol, 100 parts of commercial paraformaldehyde was added. After allowing to stand at room temperature overnight, paraformaldehyde was collected by suction filtration, washed with 100 parts of absolute methanol and then dried at ordinary temperature under a reduced pressure to recover 85 parts of anhydrous paraformaldehyde. Analytical results of the products are as follows:

|  | Before the treatment, percent | After the treatment, percent |
| --- | --- | --- |
| Content of formaldehyde | 89.5 | 99.8 |
| Water content | 10.1 | 0.1 |

Example 2

To 300 parts of absolute ethanol, 100 parts of commercial paraformaldehyde was added. After one hour the insoluble parts were collected by filtration, added again to 200 parts of absolute ethanol and then allowed to stand for one hour. The insoluble parts were collected by filtration and again immersed in 200 parts of absolute ethanol for an additional 5 hours. The mixture was subjected to suction filtration and the obtained solid was dried at a temperature of 50° C. under a reduce pressure.

Analytical results of the resulting products are as follows:

|  | Before the treatment, percent | After the treatment, percent |
| --- | --- | --- |
| Formaldehyde content | 88.0 | 99.8 |
| Water content | 11.6 | 0.15 |

Example 3

Using absolute benzylalcohol instead of methanol, the same procedures as in Example 1 were repeated. After being washed sufficiently with ether, the collected solids were dried at a temperature of 50° C., under a reduced pressure.

Analytical results of the resultant products are as follows:

|  | Before the treatment, percent | After the treatment, percent |
| --- | --- | --- |
| Formaldehyde content | 89.5 | 99.9 |
| Water content | 10.1 | 0.08 |

Example 4

To 300 parts of absolute methanol, 100 parts of commercial paraformaldehyde (95% purity) was added. After allowing to stand at room temperatures overnight, the insoluble part was collected by suction filtration, washed with 100 parts of absolute methanol and then dried at ordinary temperature under a reduced pressure, whereby 90 parts of substantially anhydrous paraformaldehyde was recovered.

Fifty parts of the above-obtained paraformaldehyde was pyrolyzed at a temperature of 150° C. to yield formaldehyde. The resulting formaldehyde gas was introduced into 400 parts of anhydrous toluene containing one part of a solution of 0.18 part of pyridine in 1000 parts of anhydrous toluene together with dry nitrogen gas and polymerized at a temperature of −20° C. The polymers began to produce 15 minutes after the initiation of gas-introduction and 35 parts of polyoxymethylene, having a viscosity of 2.25, was obtained after 3 hours. The resulting polyoxymethylene was added to a mixed solution composed of 500 parts of acetic anhydride and 100 parts of pyridine and subjected to the acetylation at a temperature of 120° C. for 3 hours. The obtained products were pressure-molded to give a tough film.

Example 5

Fifty parts of paraformaldehyde obtained in the same manner as in Example 1 was pyrolyzed at a temperature of 150° C. The resulting formaldehyde gas was introduced into 400 parts of anhydrous toluene containing $10^{-2}$ parts of tetramethylurea and polymerized at a temperature of −20° C. One hour after the initiation of gas-introduction the polymerization started, and 20 parts of polyoxymethylene, having a viscosity of 1.33, was obtained after 3 hours.

Example 6

One hundred parts of commercial paraformaldehyde (95% purity) was immersed in 500 parts of acetic anhydride and allowed to stand at room temperature overnight. The insoluble parts were collected by suction filtration, washed sufficiently with anhydrous acetone and then dried at room temperatures under a reduced pressure, whereby 95 parts of substantially anhydrous paraformaldehyde was recovered. Fifty parts of the above-obtained paraformaldehyde was thermally decomposed at a temperature of 150° C. The generated formaldehyde gas was introduced into 400 parts of anhydrous toluene containing one part of a solution of 0.154 part of tri-n-butylamine in 100 parts of anhydrous toluene together with dry nitrogen gas and allowed to react at a temperature of −20° C. The polymerization began immediately after the gas-feeding was started and 31 parts of polyoxymethylene, having a viscosity of 1.11, was obtained after 3 hours. The obtained polyoxymethylene was subjected to the terminal acetylation in the same way as in Example 1, and then molded at a temperature of 180° C. under a pressure of 100 kg./cm.², for 3 minutes to afford a tenacious lamina.

When, without the said treatment with acetic anhydride, the same commercial paraformaldehyde as it is, was pyrolyzed and polymerized under the identical conditions as above, 60 parts of polymer was obtained. However, an attempt to dissolve the polymer into p-chlorophenol was accompanied by discoloration and remarkable decomposition, and for this reason, the measurements could not be carried out.

After acetylation under the same conditions as above, molding of the polymer was attempted between hot presses. In this case, however, the decomposition was so intensive that the molding was unsuccessful.

Example 7

A mixture of 100 parts of commercial paraformaldehyde (purity 85%) and 200 parts of dried and purified N,N′-dimethylformamide was stirred well in the absence of moisture for one hour and then filtered to separate the insoluble parts, which were washed with anhydrous diethyl ether and dried at a temperature of 40° C. under a reduced pressure.

The above-obtained polyoxymethylene was placed into a decomposition vessel and then decomposed at a temperature of 130° C. in a stream of dry nitrogen to yield formaldehyde. The generated formaldehyde was directly absorbed in 800 parts of anhydrous toluene containing 100 p.p.m. of pyridine at a temperature of −20° C. Then, the reaction mixture was heated to room temperature and the polymerization was completed. The separated polymers were washed thoroughly with toluene and then acetone, and dried at a temperature of 50° C. under a reduced pressure. Viscosity, 1.82; $K_{222}$, 2.7%/min.; diacetate thereof $K_{222}$, 0.26%/min.

Examples 11–16

Treatments with various solvents and subsequent polymeriaztions are summarized below:

CHARGED PARAFORMALDEHYDE (95% PURITY): 100 PARTS

| No. | Solvent (parts) | Treatment | | Analysis | | Polymerization | |
|---|---|---|---|---|---|---|---|
| | | Temp. (° C.) | Time (hr.) | CH₂O content, percent | Water content, percent | Yield, percent | η sp./c. |
| 11 | Dimethylsulfoxide, 1,000 | 32 | 4 | 99.7 | 0.07 | 52 | 2.11 |
| 12 | Acetone, 1,000 | 32 | 4 | 99.5 | 0.07 | 68 | 1.77 |
| 13 | Tetrahydrofurane, 1,000 | 32 | 4 | 99.8 | 0.05 | 71 | 1.88 |
| 14 | Diethyleneglycol dimethylether, 1,000 | 32 | 4 | 99.6 | 0.06 | 70 | 1.88 |
| 15 | Propyleneoxide, 1,000 | 30 | 4 | 99.7 | 0.07 | 58 | 1.82 |
| 16 | Tetramethylenesulfone, 1,000 | 50 | 2 | 99.5 | 0.07 | 67 | 1.91 |

Example 8

100 parts of commercially available paraformaldehyde (purity 95%) were immersed in 300 parts of dehydrated and purified ethyleneglycol, then filtered, washed sufficiently by dried diethylether, dried at 50° C. in vacuo and pyrolyzed as in Example 4. The resulting material was absorbed in 800 parts of diether-ether at −20° C. without any purification, and 0.0001 part of tri-n-butylamine was added and the resulting mixture was subjected to polymerization. The polymerization was commenced without delay, and methanol in excess was added after 4 hrs. The resulting polymer was separated, washed with methanol and dried in vacuo. The yield was 82 parts, viscosity was 2.32. Its diacetate was formed to a tough film in a hot press without decomposition.

Example 9

In a moisture-proof vessel, 100 parts of commercially available paraformaldehyde (purity 95%) were immersed and washed with 300 parts of anhydrous diethyl ether two times, and then filtered under suction. The resulting material was decomposed, as is, to produce gaseous formaldehyde, which was then absorbed, as is, in 600 parts of diethyl ether at −20° C. to which 0.01 part of phenylisonitrile was then added. The resulting mixture was subjected to polymerization for 5 hours, after which the produced polymer was separated to obtain 86 parts of polymer.

The viscosity of its diacetate was 2.31, from which a sufficiently tough film was cast.

Example 10

In the same manner as in Example 9, 100 parts of commercially available paraformaldehyde (purity 95%) was immersed in 500 parts of anhydrous dimethyl sulfoxide for 1 hr., filtered and washed with anhydrous diethyl ether, and thereafter decomposed to obtain paraformaldehyde, which was then absorbed in 600 parts of diethyl ether at −20° C. 0.05 part of cyclohexylisonitrile was added to the diethyl ether having paraformaldehyde absorbed therein. The resulting mixture was heated to room temperature within 10 hours to complete the polymerization of paraformaldehyde. After separating and drying the produced polymer was obtained 68 parts of polymer having a viscosity of 2.03. This polymer was cast into a tough, white film in a hot press after esterification of the polymer.

What is claimed is:

1. A method of producing high molecular weight polyoxymethylene, said method comprising washing a solid low molecular weight polyoxymethylene with at least one treating agent selected from the group consisting of
    (a) monohydric and polyhydric alcohols,
    (b) ethers,
    (c) carboxylic anhydrides,
    (d) ketones,
    (e) N,N'-dimethylformamide, N,N' - dimethylacetamide, N-methylpyrrolidone, pyrrolidone, dimethylsulfoxide, diethylsulfoxide and tetramethylsulfone.
at a temperature of −20° to 50° C., said treating agent being present in an amount at least twice the weight of the polyoxymethylene, removing said treating agent by evaporation, decomposing the thusly treated polyoxymethylene to form formaldehyde and polymerizing the formaldehyde in the presence of a catalyst.

2. A method as claimed in claim 1 wherein washing is effected at about room temperature.

3. A method as claimed in claim 1 wherein washing is effected for about 2–4 hours.

4. A method as claimed in claim 1 wherein decomposition of the polyoxymethylene is effected at 100–250° C.

5. A method as claimed in claim 1 wherein polymerization of formaldehyde is effected at a temperature of −40° to 90° C.

6. A method as claimed in claim 5 wherein the temperature of polymerization is −30° to 40° C.

7. A method as claimed in claim 1 wherein the catalyst is selected from the group consisting of aliphatic amines, alicyclic amines, primary aromatic amines, onium salts thereof, sulfonium salts, phosphonium salts, metal alkyl compounds, carbonamides, thiocarbonamides and carbodiimides.

8. A method as claimed in claim 1 wherein polymerization of formaldehyde is effected in the presence of a solvent.

9. A method as claimed in claim 8 wherein the solvent is selected from the group consisting of ethers, nitriles, aliphatic hydrocarbons, aromatic hydrocarbons and halogenated hydrocarbons.

10. A method as claimed in claim 1 comprising subjecting the polymerized formaldehyde to end group acetylation with acetic anhydride.

11. A method as claimed in claim 10 wherein acetylation is effected at 120° C. for about 3 hours.

References Cited

UNITED STATES PATENTS

| 2,775,570 | 12/1956 | Barkdoll | 260—33.4 |
| 2,780,652 | 2/1957 | Gander | 260—606 |
| 2,841,570 | 7/1958 | MacDonald | 260—67 |
| 3,169,840 | 2/1965 | Wood | 55—29 |
| 3,287,414 | 11/1966 | Fukui et al. | 260—606 |

WILLIAM H. SHORT, *Primary Examiner.*

L. M. PHYNES, *Assistant Examiner.*

U.S. Cl. X.R.

260—606, 615.5